(12) United States Patent
Liu et al.

(10) Patent No.: US 10,203,750 B2
(45) Date of Patent: Feb. 12, 2019

(54) TOUCH PANEL AND A MANUFACTURING METHOD THEREOF

(71) Applicant: TPK Touch Solutions Inc., Taipei (TW)

(72) Inventors: Chen-Yu Liu, Taoyuan (TW); Li-Wei Kung, Taipei (TW); Hsi-Chien Lin, Hsinchu (TW)

(73) Assignee: TPK Touch Solutions Inc., Taipei (TW)

( * ) Notice: Subject to any disclaimer, the term of this patent is extended or adjusted under 35 U.S.C. 154(b) by 6 days.

(21) Appl. No.: 15/672,268

(22) Filed: Aug. 8, 2017

(65) Prior Publication Data

US 2017/0336859 A1   Nov. 23, 2017

Related U.S. Application Data

(62) Division of application No. 14/053,605, filed on Oct. 15, 2013, now Pat. No. 9,760,164.

(30) Foreign Application Priority Data

Oct. 17, 2012 (CN) .......................... 2012 1 0393725

(51) Int. Cl.
*G06F 3/047* (2006.01)
*G06F 3/01* (2006.01)
*G06F 3/041* (2006.01)
*G06F 3/044* (2006.01)

(52) U.S. Cl.
CPC ................ *G06F 3/01* (2013.01); *G06F 3/041* (2013.01); *G06F 3/044* (2013.01); *G06F 3/047* (2013.01); *G06F 2203/04103* (2013.01)

(58) Field of Classification Search
CPC ....................................................... G06F 3/047
See application file for complete search history.

(56) References Cited

U.S. PATENT DOCUMENTS

| 2008/0143906 A1* | 6/2008 | Allemand | B82Y 10/00 349/43 |
| 2011/0227858 A1* | 9/2011 | An | G06F 3/044 345/174 |
| 2013/0258614 A1* | 10/2013 | Misaki | G06F 3/044 361/748 |

FOREIGN PATENT DOCUMENTS

JP    WO 2012077320 A1 *   6/2012   ............. G06F 3/044

* cited by examiner

*Primary Examiner* — Alexander Gross
(74) *Attorney, Agent, or Firm* — Cooper Legal Group, LLC

(57) ABSTRACT

Present invention discloses a touch panel and a manufacturing method thereof, the touch panel comprises: a substrate; a silver nano-wire electrode layer provided on the substrate comprising a connecting area and a non-connecting area; a first protective layer provided on silver nano-wire electrode layer having a first hole corresponding to connecting area; a second protective layer provided on first protective layer having a second hole corresponding to position of first hole; and a connecting wire provided on second protective layer connected to silver nano-wire electrode layer in connecting area through second hole and first hole. With the touch panel, the problem that etching solution can't seep when a single protective layer is too thick and the problem that a silver nano-wire layer is easily oxidized and the adhesion of the silver nano-wire layer is poor when a single protective layer is too thin can be avoided.

20 Claims, 7 Drawing Sheets

TOUCH PANEL AND A MANUFACTURING METHOD THEREOF

All related applications are incorporated by reference. The present application is based on, and claims priority from, China Application Serial Number No. 201210393725.2, filed on Oct. 17, 2012, the disclosure of which is hereby incorporated by reference herein in its entirety. This application is a Divisional application of Ser. No. 14/053,605, filed Oct. 15, 2013, now pending, by the present inventors, which is incorporated herein by reference.

BACKGROUND OF THE INVENTION

Field of the Invention

The present invention relates to a touch panel and a manufacturing method thereof.

Description of the Prior Art

Sensing electrode material of traditional touch panels mostly employs indium tin oxide (ITO). Recently, since source of indium ore is not easily obtained and indium resource is exhausting, employing various transparent electrodes to replace indium tin oxide (abbreviated as ITO) becomes a hot issue, wherein using silver nano-wire to replace ITO is a possible solution at present. However, in comparison with ITO, silver nano-wire is easily oxidized and has a low adhesion on a glass or Polyethylene terephthalate (PET) substrate, which would lead to a quality problem in yield. Therefore, as shown in FIG. 1, a silver nano-wire layer 110 is formed on a substrate 100, and then another protective layer 120 would be coated to cover the silver nano-wire layer 110, the protective layer 120 may isolate a part of air and promote antioxidation ability of the silver nano-wire layer 110. The silver nano-wire layer 110 dispersed on the substrate 100 itself has a certain degree of closeness because an electrode pattern is in the silver nano-wire layer 110, the protective layer 120 may contact the substrate 100 through gaps between the silver nano-wires, and thus the adhesion of the silver nano-wire layer 110 on the substrate 100 may be promoted via a better adhesion of the protective layer 120 on the substrate 100.

However, there is a deficiency in design if the protective layer is too thick or too thin. If the protective layer is too thick, an etching solution in an etching process would be more difficult to seep through the protective layer so as to etch silver nano-wires. If the protective layer is too thin, the antioxidation ability for the silver nano-wire layer would be lowered, and an effect of coupling the protective layer to the substrate would also be reduced, and the adhesion for the silver nano-wire layer on the substrate would be lowered, and thus the yield rate of the touch panel would be affected negatively.

SUMMARY OF THE DISCLOSURE

A technical problem to be resolved by the present invention is to provide a touch panel and a manufacturing method thereof, so as to resolve an existing problem when a single protective layer is too thick or too thin in the prior art.

The present invention provides a touch panel, the touch panel comprises: a substrate; a silver nano-wire electrode layer provided on the substrate and comprising a connecting area and a non-connecting area; a first protective layer provided on the silver nano-wire electrode layer and having a first hole corresponding to the connecting area; a second protective layer provided on the first protective layer and having a second hole corresponding to a position of the first hole; and a connecting wire provided on the second protective layer and connected to the silver nano-wire electrode layer in the connecting area through the second hole and the first hole.

The present invention provides the manufacturing method of a touch panel comprising: providing at least a substrate; forming at least a silver nano-wire layer on the substrate; forming a first protective layer on the silver nano-wire layer, wherein the first protective layer has a thickness suitable for etching solution to penetrate; Using the etching solution to penetrate into the first protective layer to etch the silver nano-wire layer to form a silver nano-wire electrode layer; forming a second protective layer on the first protective layer, and the assemblage of the first protective layer and the second protective layer has an antioxidation ability for the requirement of the silver nano-wire electrode layer and an adherence ability for the disposition of the silver nano-wire electrode layer onto the substrate.

The present invention provides a touch panel, the touch panel comprises: at least a substrate; at least a silver nano-wire electrode layer provided on the substrate, the electrode layer has a electrode pattern with at least one interval space; a first protective layer provided on the silver nano-wire electrode layer, wherein the first protective layer bonds with the substrate through the interval space and has a thickness suitable for the penetration of the etching solution, wherein the etching solution penetrates into the first protective layer to etch a silver nano-wire layer to form the silver nano-wire electrode layer; a second protective layer provided on the first protective layer, and the assemblage of the first protective layer and the second protective layer has an antioxidation ability for the requirement of the silver nano-wire electrode layer and an adherence ability for the disposition of the silver nano-wire electrode layer onto the substrate.

In the present invention, by providing the second protective layer on the first protective layer, the first protective layer may be thinned, and an etching solution used in the etching process easily seeps through the protective layer so as to etch the silver nano-wire layer. The second protective layer promotes adhesion and antioxidation abilities for the silver nano-wire layer on a substrate.

Figure 1:
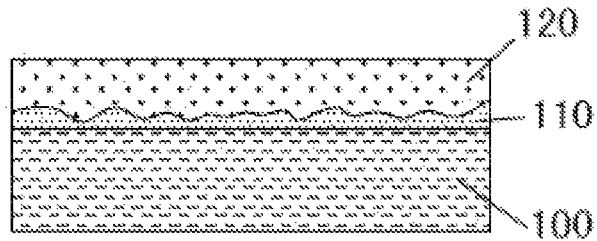
FIG. 1 is a schematic diagram illustrating that a protective layer is provided on a silver nano-wire layer in the prior art.

The reference numerals are as follows:
100, 200, 300, 400 substrate
110, 210*a* silver nano-wire layer 210b, 310b, 310b',310b",410b silver nano-wire electrode layer
120, 220, 320, 320',320",420 first protective layer
230, 330, 330',330",430 second protective layer
240, 340, 340',340",440 second hole
250, 350,350', 450 first hole
260, 360, 360',360",460 connecting wire
411 first electrode unit
412 first connecting wire
413 second electrode unit
470 second connecting wire
M1 connecting area
M2 non-connecting area

DETAILED DESCRIPTION OF THE EMBODIMENTS

Hereinafter the present invention will be described in detail in combination with the drawings and specific embodiments which are not used to limit the present invention. Hereinafter, orientations, such as "on" and "below", are only used to indicate relative positional relationship among elements but not used to limit a protective scope of the present invention.

Figure 2:
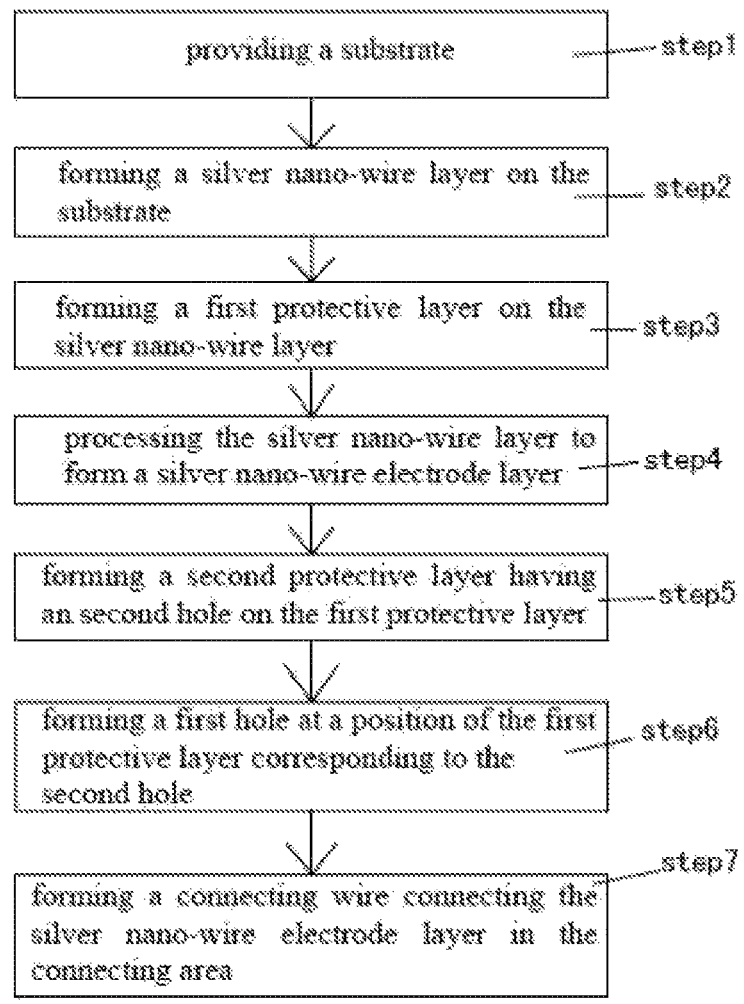
FIG. 2 is a diagram illustrating steps of the manufacturing method of a touch panel of the present invention.

FIG. 2 is a diagram illustrating process steps of a manufacturing method of a touch panel of the present invention. A manufacturing method of a touch panel of the present invention comprises the following steps.

Figure 3A:
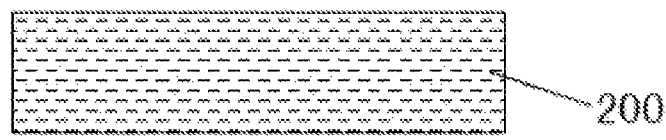
FIGS. 3*a*-3*g* are schematic diagrams of the touch panel corresponding to respective process step of FIG. 2.

Step 1: at least a substrate is provided. Referring to FIG. 3a, a substrate 200 is provided; the substrate 200 employs a transparent material which may be a non-flexible substrate, such as a glass substrate, or a flexible substrate, such as polyethylene terephthalate (PET) plastic substrate. A surface of the substrate 200 may be a flat surface or a curved surface.

Figure 3B:
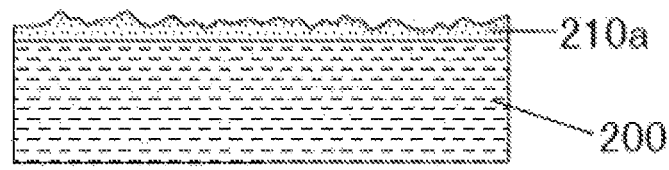

Step 2: at least a silver nano-wire layer is formed on the substrate. Referring to FIG. 3b, the entire layer of a silver nano-wire layer 210a is formed on the substrate 200. Forming the silver nano-wire layer 210a may employ a process of depositing, sputtering or the like.

Figure 3C:
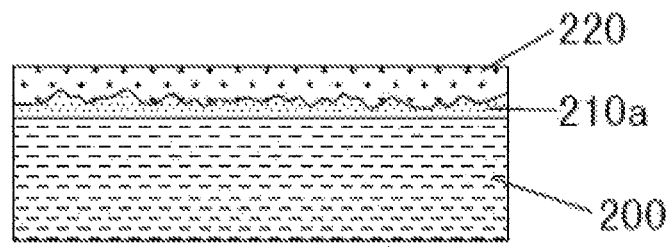

Step 3: a first protective layer is formed on the silver nano-wire layer. Referring to FIG. 3c, a first protective layer 220 is formed on the silver nano-wire layer 210a. The first protective layer 220 has a thickness suitable for etching solution to penetrate. To be specific, the thickness of the first protective layer 220 could be adjusted according to the penetrative ability of the etching solution, or vice versa, the penetrative ability of the etching solution could be adjusted according to the thickness of the first protective layer 220. A thickness of the first protective layer 220 may be from 50 nm to 500 nm, and within this thickness range, an etching solution may seep through the first protective layer 220 so as to etch the silver nano-wire layer 210a. The first protective layer 220 employs a transparent insulating material, such as silicon dioxide, epoxy resin, acrylic polymer and the like, or a combination thereof.

Figure 3D:
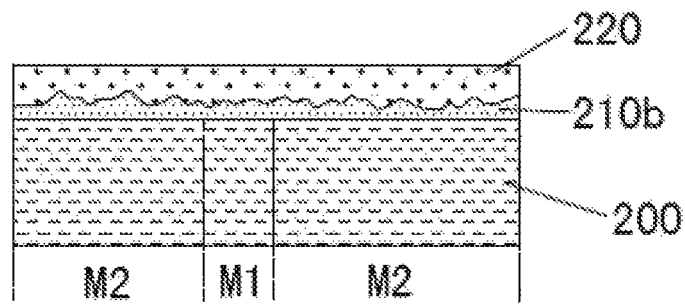
Figure 4:
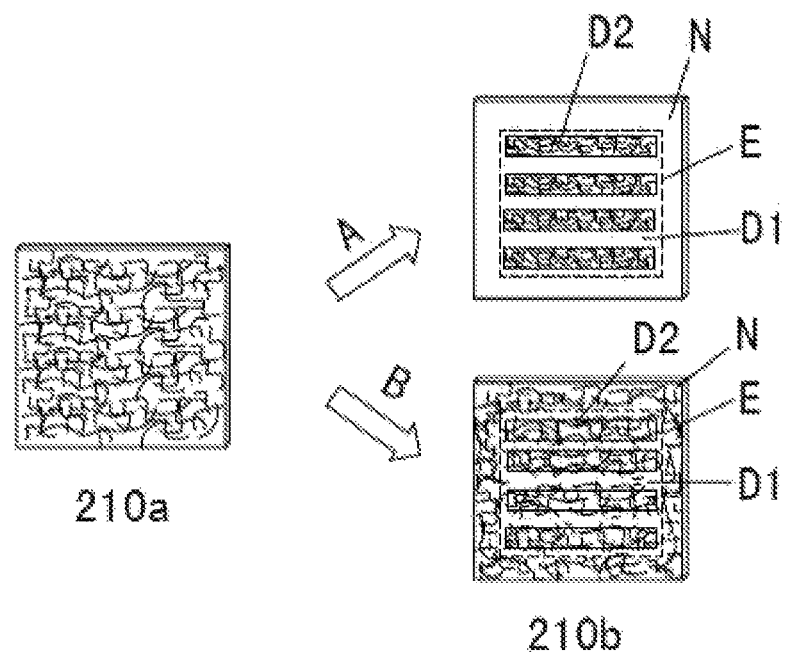
FIG. 4 is a schematic diagram illustrating a full etching process A and a non-full etching process B.

Step 4: the silver nano-wire layer is processed to form a silver nano-wire electrode layer. Referring to FIG. 3d together with FIG. 4, the etching solution is used to penetrate into the first protective layer 220. The penetrated etching solution would etch the silver nano-wire layer 210a to form a silver nano-wire electrode layer 210b with an electrode pattern. In an embodiment, the electrode pattern of the silver nano-wire electrode layer 210b may be a strip-like electrode structure of FIG. 4. In the other embodiments, the silver nano-wire electrode layer 210b may also employ other electrode structures. As shown in FIG. 4, in an embodiment, a full etching process A may be used for the silver nano-wire layer 210a. The so-called "full etching process" is that all of the silver nano-wires existed in the non-electrode pattern area N would be etched off from the substrate 200. In another embodiment, a non-full etching process B may be used for the silver nano-wire layer 210a, that is, during etching, not all the silver nano-wires in a non-electrode pattern area N may be etched off from the substrate 200 and the non-electrode pattern area N is only etched as an area electrically isolated from the electrode pattern area E. In comparison with the full etching process A, in that case of using the non-full etching process B, after etching, color difference between the non-electrode pattern area N and the electrode pattern area E is less, that is, the product structure would have a better appearance effect. An area in the silver nano-wire electrode layer 210b, which is required to be connected with outside to transmit an electrical signal, is a connecting area M1. And the other area in the silver nano-wire electrode layer 210b, which is required to detect a touch happened or not, is a non-connecting area M2.

Figure 3E:
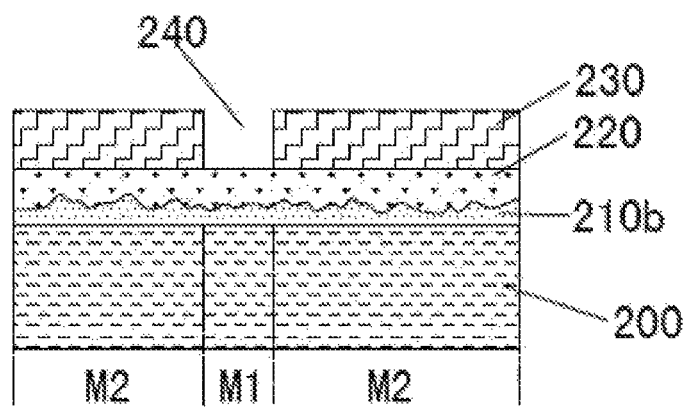

Step 5: a second protective layer is formed on the first protective layer. Referring to FIG. 3e, a second protective layer 230 is formed on the first protective layer 220, and the assemblage of the first protective layer 220 and the second protective layer 230 has an antioxidation ability for the requirement of the silver nano-wire electrode layer and an adherence ability for the disposition of the silver nano-wire electrode layer onto the substrate, which means such assemblage could meet the silver nano-wire electrode layer's antioxidation ability requirement and adhesion requirement. Further, according to other design requirement, the second protective layer 230 has at least one second hole 240 corresponding to the connecting area M1. Forming the second protective layer 230 with the second hole 240 may employ a print coating process or a lithography etching process. The second protective layer 230 employs a transparent insulating material, such as silicon dioxide, epoxy resin, acrylic polymer and the like, or a combination thereof. The thickness of the second protective layer 230 may be from 0.2 μm to 5 μm.

Figure 3F:
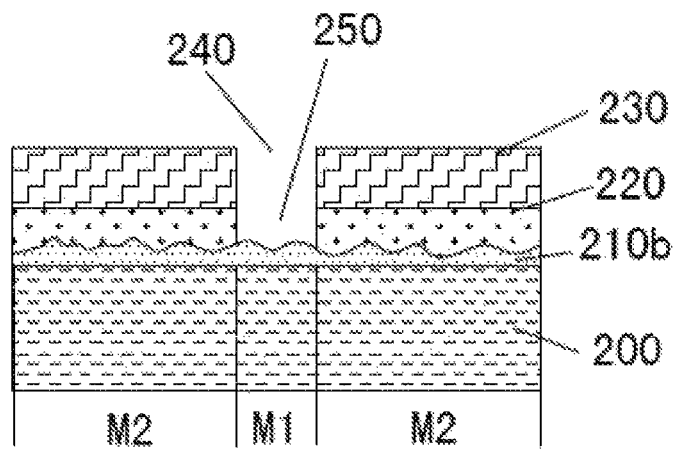

Further, in step 6, according to other design requirement, at least one first hole 250 is formed at a position of the first protective layer 220 to correspond to the second hole 240. Referring to FIG. 3f, the first protective layer 220 is processed to form the first hole 250, and the first hole 250 corresponds to a position of the second hole 240. Forming the first hole 250 in the first protective layer 220 may employ a plasma etching process.

Figure 3G:
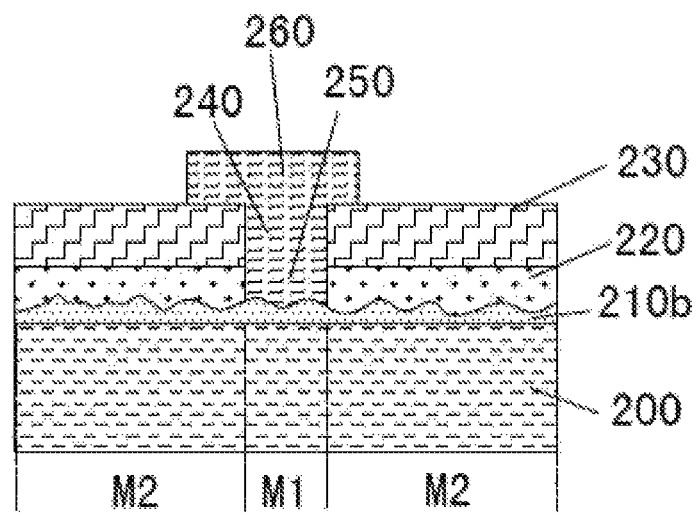

Further, in step 7, at least one connecting wire 260 is formed to connect the electrode in the connecting area M1. Referring to FIG. 3g, the connecting wire 260 is formed on the second protective layer 230, and the connecting wire 260 electrically connects with the silver nano-wire electrode layer 210b in the connecting area M1 through the second hole 240 and the first hole 250. But the connecting wire 260 may adapt other ways to electrically connect with the silver nano-wire electrode layer 210b without the first hole 250 and the second hole 240, therefore, the first hole 250 and the second hole 240 may not be a necessary design in the present embodiment.

It should be noted that the first hole 250 may not need to penetrate the first protective layer 220, that is, the first protective layer 220 may be thinned to an extent so as to make the connecting wire 260 electrically connected with the silver nano-wire electrode layer 210b in the connecting area M1. The connecting wire 260 may employ a metal material such as silver, aluminum, copper and the like, an alloy material such as molybdenum aluminum molybdenum alloy and the like, a transparent conductive material such as indium tin oxide (ITO) and the like, or a combination thereof.

As shown in FIG. 3g, a touch panel, which could be formed by the manufacturing method mentioned aforesaid or the other methods, comprises: at least a substrate 200, at least a silver nano-wire electrode layer 210b provided on the substrate 200, a first protective layer 220 and a second protective layer 230. Refer to FIG. 4, the silver nano-wire electrode layer 210b has a electrode pattern with interval spaces, wherein the interval spaces may be existed between different electrodes (like interval space D1), or existed between different silver nano-wires of the same electrode (like interval space D2) because each electrode is formed by the silver nano-wires in a form of interleaved winding. The first protective layer 220 is provided on the silver nano-wire electrode layer 210b and bonds with the substrate 200 through the interval spaces D1 and D2. The first protective layer 220 has a thickness suitable for the penetration of etching solution, and the etching solution penetrates into the first protective layer to etch a silver nano-wire layer to form the silver nano-wire electrode layer 210b. The second protective layer 230 is provided on the first protective layer 220, and the assemblage of the first protective layer 220 and the second protective layer 230 has an antioxidation ability for the requirement of the silver nano-wire electrode layer 210b and an adherence ability for the disposition of the silver nano-wire electrode layer 210b onto the substrate 200.

The silver nano-wire electrode layer 210b has an connecting area M1 required to be connected with outside for transmitting an electrical signal. The first protective layer 220 has a first hole 250 corresponding to the connecting area M1, and the second protective layer 230 has a second hole 240 corresponding to a position of the first hole 250; and a connecting wire 260 provided on the second protective layer 230 and electrically connected to the silver nano-wire electrode layer 210b in the connecting area M1 through the second hole 240 and the first hole 250, but the connecting wire 260 may adapt other ways to electrically connect with the silver nano-wire electrode layer 210b without the first hole 250 and the second hole 240, therefore, the first hole 250 and the second hole 240 may not be a necessary design in the present embodiment.

Preferably, the substrate 200 employs a transparent material, such as glass substrate or a polyethylene terephthalate (PET) plastic material. A surface of the substrate 200 may be a flat surface or a curved surface.

Preferably, the thickness of the first protective layer 220 may be from 50 nm to 500 nm.

Preferably, the thickness of the second protective layer 230 may be from 0.2 μm (micrometer) to 5 μm.

Preferably, the material of the first protective layer 220 may be a transparent insulating material, such as silicon dioxide, epoxy resin, acrylic polymer and the like.

Preferably, the material of the second protective layer 230 may be a transparent insulating material, such as silicon dioxide, epoxy resin, acrylic polymer and the like.

Preferably, the thickness of the first protective layer 220 or the thickness of the second protective layer 230 may be selected according to different materials. Preferably, the connecting wire 260 may employ a metal material such as silver, aluminum, copper and the like, an alloy material such as molybdenum aluminum molybdenum alloy and the like, a transparent conductive material such as indium tin oxide (ITO) and the like, or a combination thereof.

The above elements used in the touch panel is the same or similar to the method described before, therefore the material, manufacturing process or property of the elements would not be described here again.

Figure 5A:
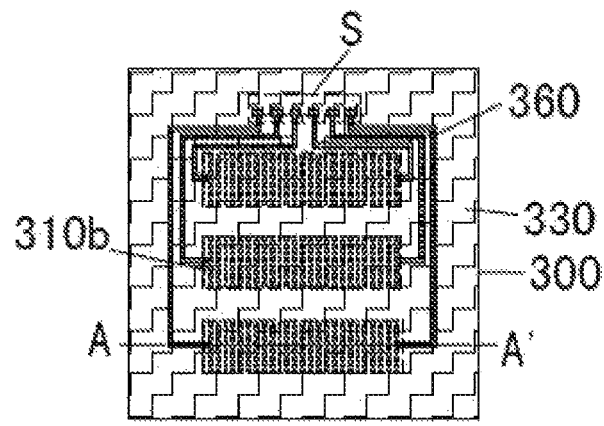
FIG. 5*a* is a top view of a touch panel of the present invention.
Figure 5B:
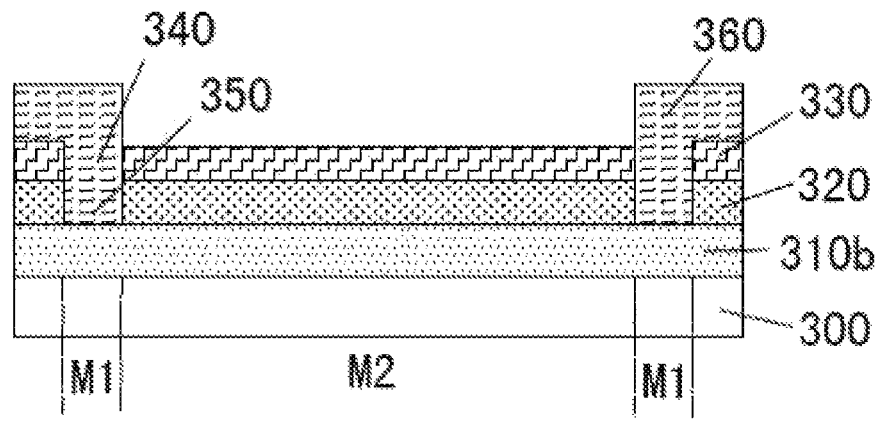
FIG. 5*b* is a cross sectional view along an A-A' line of FIG. 5*a*.

FIG. 5a illustrates an embodiment of a touch panel of the present invention, FIG. 5b is a cross sectional view along an A-A' line of FIG. 5a. In the present embodiment, a silver nano-wire electrode layer 310b contains a plurality of electrodes, maybe in the form of strip-like pattern, and both ends of each electrode are connected with connecting wires 360, the connecting wires 360 are collected at a bonding area S. In the present embodiment, the number of the substrate 300 is one and the number of the silver nano-wire electrode layer 310b is one, too, and the silver nano-wire electrode layer 310b is an uniaxial electrode structure, which includes multiple electrodes extended along a same direction and disposed on the same surface of the substrate 300. The ends of the connecting wires 360 collected at the bonding area S are connected to a controller (not shown) by coupling a flexible circuit board (not shown), and a sensing signal transmitted by the connecting wire is processed by the controller. In another embodiment, each of the connecting wires 360 may be only connected to one end of each of the electrodes. In another embodiment, the number of the bonding area S may be multiple, that is, it may be adjusted according to the specific silver nano-wire electrode layer 310b. In the case of the connecting wires 360 connecting with two ends of each strip-like electrode, when a size of the touch panel is larger, the connecting wires 360 located at the two sides of the touch panel form a closed circuit via the flexible circuit board, which may reduce signal degradation of the sensing signal due to the effect of resistance value, so as to promote sensing sensitivity of the touch panel. Other characteristics of the touch panel of the present embodiment are the same as those of the previous embodiment, therefore detailed description thereof is omitted.

Figure 5C:
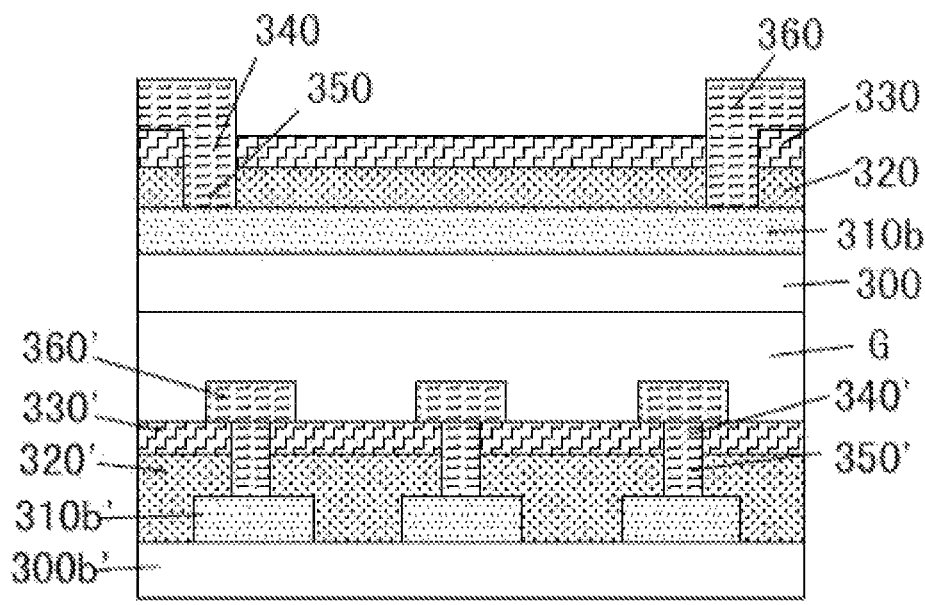
FIG. 5*c* is another cross sectional view along an A-A' line of FIG. 5*a*.

FIG. 5c is another cross sectional view along an A-A' line of FIG. 5a. In the present embodiment, the number of the substrate is two and the silver nano-wire electrode layer is two, too, and the two silver nano-wire electrode layers are a uniaxial electrode structure and are disposed on different substrate respectively. In FIG. 5c, a silver nano-wire electrode layer 310b', at least one connecting wire 360', a first protective layer 320', and a second protective layer 330' that are similar to the silver nano-wire electrode layer 310b, the connecting wires 360, the first protective layer 320, and a second protective layer 330 shown in FIG. 5b are added to be formed on a new substrate 300b'. But the extending direction of the electrode structure of the silver nano-wire electrode layer 310b' is different from that of the silver nano-wire electrode layer 310b. The extending direction of the electrode structure on the substrate 300b' is not parallel to the extending direction of the electrode structure on the substrate 300. Best of all, the two extending directions are perpendicular from each other, such as if the extending direction of the electrode structure on the substrate 300 is along X-axial direction, and the extending direction of the electrode structure on the substrate 300b' is along Y-axial direction. The substrate 300 and 300' are laminated to each other through a transparent adhesive layer G.

Figure 5D:
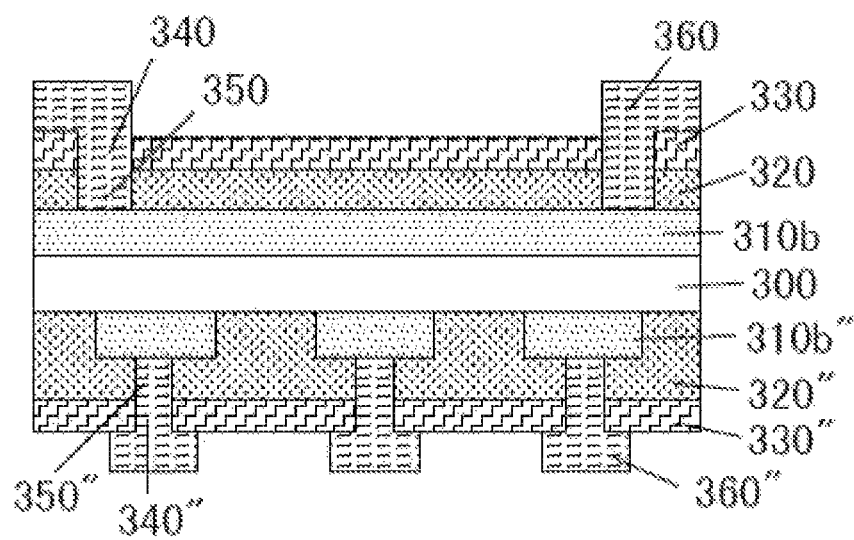
FIG. 5*d* is another cross sectional view along an A-A' line of FIG. 5*a*.

FIG. 5d is another cross sectional view along an A-A' line of FIG. 5a. In the present embodiment, the number of the substrate is one and the number of the silver nano-wire electrode layer is two, and the two silver nano-wire electrode layers are a uniaxial electrode structure and are disposed on the two opposite surfaces of the substrate respectively. In FIG. 5d, a silver nano-wire electrode layer 310b", at least one connecting wire 360", a first protective layer 320", a second protective layer 330" that are similar to the silver nano-wire electrode layer 310b, the connecting wires 360, the first protective layer 320, and a second protective layer 330 shown in FIG. 5b are directly formed on the other surface of the substrate 300. But the extending direction of the electrode structure on the upper surface of the substrate 300 is along one axial direction (like X-axial direction) and the extending direction of the electrode structure on the lower surface of the substrate 300 is along the other axial direction (like Y-axial direction). Other features of the embodiment could be referred to the aforesaid embodiments and are omitted here.

Figure 6A:
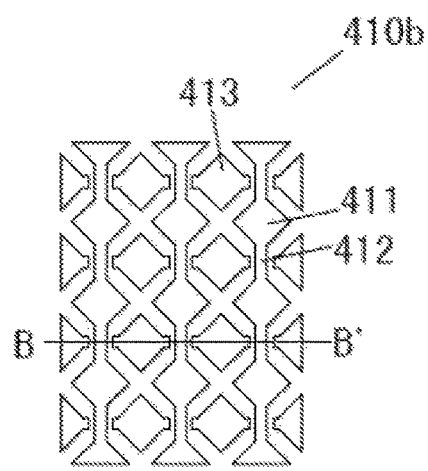
FIG. 6*a* is a top view of a silver nano-wire electrode layer of the present invention.
Figure 6B:
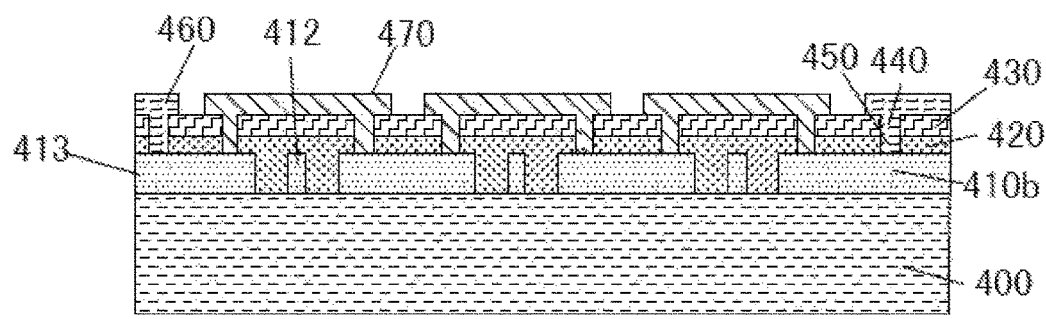
FIG. 6*b* is a cross sectional view of a touch panel using the silver nano-wire electrode layer of FIG. 6*a*.

FIG. 6a illustrates another silver nano-wire electrode layer of the present invention, FIG. 6b is a cross sectional view of the touch panel along a B-B' line shown in FIG. 6a. As shown in FIG. 6a, the number of the substrate 400 is one and the number of the silver nano-wire electrode layer 410b is one, too, and the silver nano-wire electrode layer 410b is a biaxial electrode structure. The silver nano-wire electrode layer 410b contains a plurality of first electrode units 411 arranged along a first direction, a plurality of first wires 412 electrically connecting adjacent first electrode units 411, and a plurality of second electrode units 413 arranged along a second direction and respectively provided at two sides of the first wire 412. The first direction is different from the second direction. Preferably, the first direction is perpendicular to the second direction. As shown in FIG. 6b, the touch panel using the silver nano-wire electrode layer 410b is different from the previous embodiment in that a first hole 450 and a second hole 440 corresponding to the first hole 450 are formed respectively in a first protective layer 420 and a second protective layer 430 on respective second electrode units 413, which means the first hole 450 and the second hole 440 could be formed in the non-connecting area M2 in the present embodiment. On the second protective layer 430 of the touch panel of the present embodiment, besides the connecting wire 460 is provided, a plurality of second wires 470 are further provided, each second wire 470 is electrically connected to the adjacent second electrode units 413 through the first holes 450 and the second holes 440 provided above respective second electrode units 413. The second wire 470 may employ a metal material such as silver, aluminum, copper and the like, an alloy material such as molybdenum aluminum molybdenum alloy and the like, a transparent conductive material such as indium tin oxide (ITO) and the like, or a combination thereof. In an embodiment, the connecting wire 460 and the second wire 470 employ the same material, both of which may be formed in the same step. Other characteristics of the touch panel of the present embodiment are the same as those of the previous embodiment, therefore detailed description thereof is omitted.

The electrode pattern described in the foresaid embodiments could be but not limited to strip-like electrodes shown in FIG. 5a or diamond-like electrodes shown in FIG. 6a. Having electrodes arranged along one direction in the same silver nano-wire electrode layer is so-called "uniaxial electrode structure", and having electrodes arranged along two directions in the same silver nano-wire electrode layer is so-called "biaxial electrode structure".

In the present invention, by providing the second protective layer on the first protective layer, the first protective layer may be thinned, and an etching solution in the etching process easily seeps through the protective layer so as to etch the silver nano-wire layer. Meanwhile, the connecting wire formed subsequently is easily electrically connected with the silver nano-wire electrode layer thereunder.

In the present invention, the second protective layer provided on the first protective layer has a protective effect, and promotes adhesion and antioxidation abilities of the silver nano-wire layer on a substrate.

When a non-full etching process is employed, since the second protective layer is additionally provided on the first protective layer, the whole of protective layers is not too thin, which may prevent a possible short-circuit problem in that case of the connecting wire connecting the silver nano-wire electrode layer at the periphery of the protective layer when there is only the first protective layer.

Certainly, the present invention may further have various other embodiments. The person skilled in the art may make various corresponding modifications and variations according to the present invention without departing from the spirit and essence of the present invention, however, these modifications and variations are considered to be within the protective scope of the claims of the present invention.

What is claimed is:

1. A manufacturing method of a touch panel comprising:
providing at least a substrate;
forming at least a silver nano-wire layer with a plurality of silver nano-wires on the substrate;
forming a first protective layer on the silver nano-wire layer, wherein the first protective layer has a thickness suitable for an etching solution to penetrate;
using the etching solution to penetrate into the first protective layer to etch the plurality of silver nano-wires of the silver nano-wire layer to form a silver nano-wire electrode layer;
forming a second protective layer on the first protective layer, and the assemblage of the first protective layer and the second protective layer has an antioxidation ability for the requirement of the silver nano-wire electrode layer and an adherence ability for the disposition of the silver nano-wire electrode layer onto the substrate;
forming at least a second hole on the second protective layer, wherein the second hole corresponds to a connecting area of the silver nano-wire electrode layer;
forming at least a first hole on the first protective layer to correspond to the second hole, wherein a position of the second hole aligns to a position of the first hole; and
forming at least a connecting wire on the second protective layer, wherein the connecting wire is electrically connected with the silver nano-wire electrode layer in the connecting area through the second hole and the first hole.

2. The manufacturing method of the touch panel according to claim 1, wherein the silver nano-wire electrode layer comprising a first connecting area and a second connecting area formed on two ends of the silver nano-wire electrode layer.

3. The manufacturing method of the touch panel according to claim 1, wherein a thickness of the first protective layer is from 50 nm to 500 nm.

4. The manufacturing method of the touch panel according to claim 1, wherein a thickness of the second protective layer is from 0.2 μm to 5 μm.

5. The manufacturing method of the touch panel according to claim 1, wherein forming the second hole employs a print coating process or a lithography etching process.

6. The manufacturing method of the touch panel according to claim 1, wherein forming the first hole employs a plasma etching process.

7. The manufacturing method of the touch panel according to claim 1, wherein forming the silver nano-wire electrode layer employs a full etching process or a non-full etching process.

8. The manufacturing method of the touch panel according to claim 1, wherein the silver nano-wire electrode layer comprises a plurality of strip-like electrodes separated from each other and arranged in parallel.

9. The manufacturing method of the touch panel according to claim 1, wherein the touch panel comprises a center area and a surrounding area, and the silver nano-wire electrode layer comprises a plurality of strip-like electrodes formed on the center area.

10. The manufacturing method of the touch panel according to claim 9, wherein the silver nano-wire electrode layer comprises an interval space between adjacent strip-like electrodes of the plurality of strip-like electrodes, and wherein the plurality of silver nano-wires in the interval space is full etched or partially etched in the using the etching solution.

11. The manufacturing method of the touch panel according to claim 9, wherein the plurality of silver nano-wires in the surrounding area is full etched or partially etched in the using the etching solution.

12. The manufacturing method of the touch panel according to claim 1, wherein the first hole is an impenetrable hole in the first protective layer.

13. A manufacturing method of a touch panel comprising:
    providing a substrate;
    disposing a plurality of silver nano-wires on the substrate to form a silver nano-wire layer;
    forming a first protective layer on the silver nano-wire layer;
    patterning the silver nano-wire layer to form a plurality of touch sensing electrodes by an etch step;
    forming a second protective layer on the first protective layer;
    forming a second hole on the second protective layer, wherein the second hole corresponds to a first connecting area of a touch sensing electrode layer of the plurality of touch sensing electrodes;
    forming a first hole on the first protective layer to correspond to the second hole, wherein a position of the second hole aligns to a position of the first hole; and
    forming a first connecting wire on the second protective layer, wherein the first connecting wire is electrically connected with the touch sensing electrode layer through the second hole and the first hole.

14. The manufacturing method of the touch panel according to claim 13, wherein the etch step allows an etch solution to penetrate into the first protective layer for etching the plurality of silver nano-wires.

15. The manufacturing method of the touch panel according to claim 13, wherein the touch panel comprises a center area and a surrounding area, and the plurality of touch sensing electrodes comprises a plurality of strip-like electrodes formed on the center area.

16. The manufacturing method of the touch panel according to claim 15, wherein an interval space is formed between adjacent strip-like electrodes of the plurality of strip-like electrodes, and wherein the plurality of silver nano-wires in the interval space is full etached or partially etached in the in the etch step.

17. The manufacturing method of the touch panel according to claim 15, wherein the plurality of silver nano-wires in the surrounding area is full etched or partially etched in the etch step.

18. The manufacturing method of the touch panel according to claim 13, further comprising:
    forming a third hole on the second protective layer, wherein the third hole corresponds to a second connecting area of the touch sensing electrode of the plurality of touch sensing electrodes;
    forming a fourth hole on the first protective layer to correspond to the third hole, wherein a position of the fourth hole aligns to a position of the third hole; and
    forming a second connecting wire on the second protective layer, wherein the second connecting wire is electrically connected with the touch sensing electrode layer through the third hole and the fourth hole.

19. The manufacturing method of the touch panel according to claim 18, wherein the first hole and the fourth hole each is an impenetrable hole in the first protective layer.

20. The manufacturing method of the touch panel according to claim 13, wherein the first hole is an impenetrable hole in the first protective layer.

* * * * *